Dec. 4, 1934.  E. F. HATHORN  1,982,914
OPERATING MEANS FOR LOCKING JAWS
Filed Nov. 20, 1933
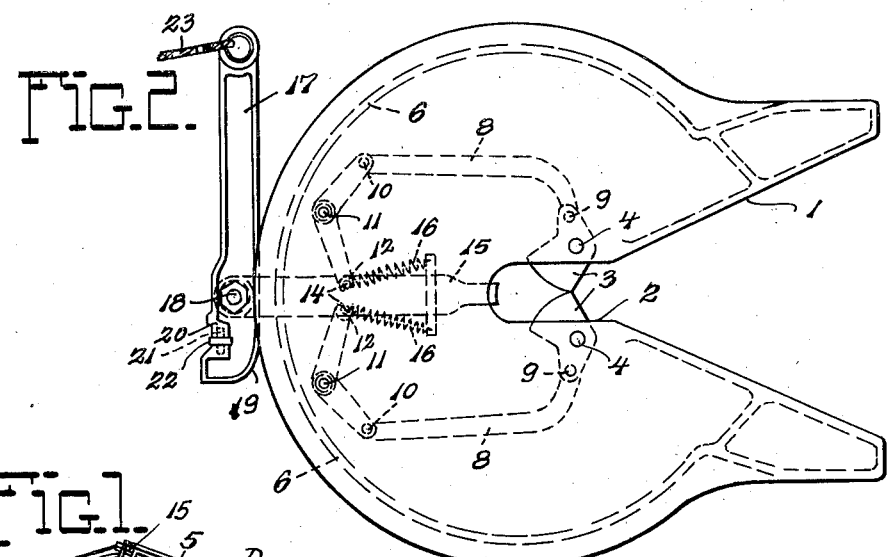
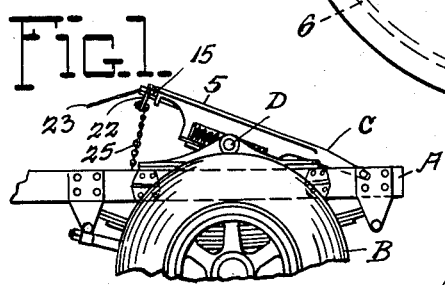
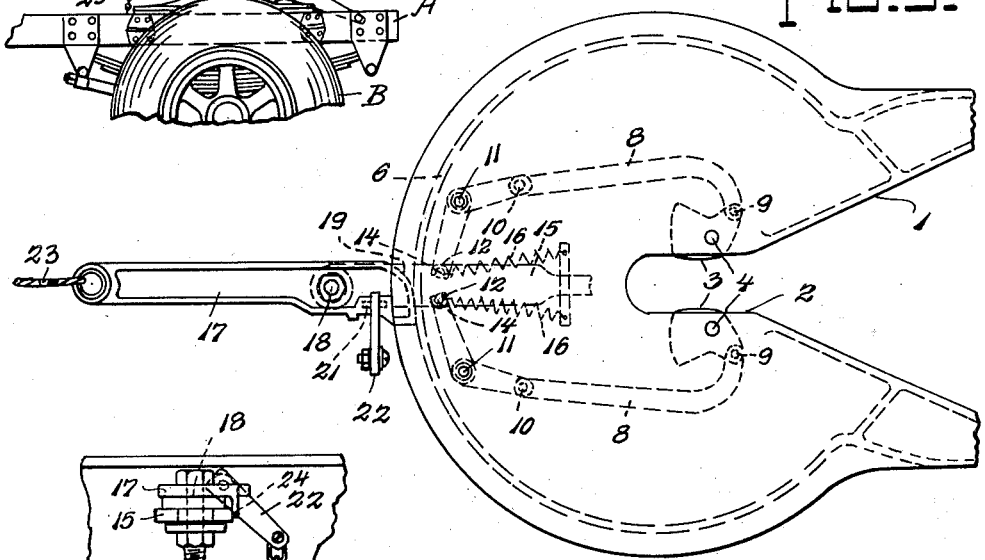
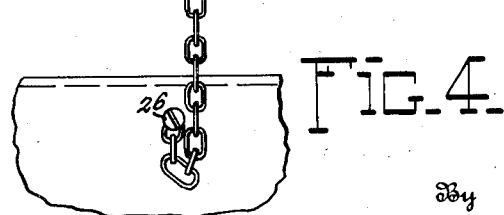
Inventor
ELMER F. HATHORN
By Robbs Cobb
Attorneys Patented Dec. 4, 1934

1,982,914

UNITED STATES PATENT OFFICE 1,982,914

OPERATING MEANS FOR LOCKING JAWS

Elmer F. Hathorn, Edgerton, Wis., assignor to Highway Trailer Company, Edgerton, Wis., a corporation Application November 20, 1933, Serial No. 698,893

12 Claims. (Cl. 280—33.1)

This invention relates to highway transportation systems and has to do with the articulated vehicle class such as tractor-trailer combinations. Specifically, the invention has to do with the coupling instrumentalities for joining the vehicles and aims to provide means for operating the locking jaws of the female assembly.

In tractor-trailer combinations employing king pin female coupling unit, the lock release lever is in the form of a drawbar that must be drawn back to operate the locking jaws. Ordinarily the procedure calls for two men, one to operate the release mechanism the other to drive the tractor forward. Of course, after the vehicles are separate, release of the locking jaw draw-bar allows the return of the jaws to a closed position in readiness for subsequent coupling operation.

It is an object of this invention to permit the single handed uncoupling of a tractor and trailer. That is, the tractor driver may easily actuate certain instrumentalities to open the locking jaws which will be positively locked in open position whilst the vehicles are driven apart; however, upon separation of the vehicles, the locking jaws are automatically returned to closed position without further manual intervention. As an ancillary feature, the movement of the fifth wheel to the tilted position which it ordinarily assumes effects the closing of the locking jaws to that there is no possibility of the jaws remaining open. It can readily be seen that if the jaws are to remain open, there is always the possibility that the same will not be closed after the tractor and trailer are joined, which will permit the separation of the same as the tractor tends to take up the load with consequent damage to the trailer, which, of course, stands in readiness to be hauled with the auxiliary supports withdrawn.

Other objects and advantageous features of this invention are to be found in the accompanying drawing and detailed description, wherein—

Figure 1 is a view in elevation of the rear end of a vehicle frame and associated parts disclosing a female fifth wheel mounted thereon carrying my novel apparatus for operating the locking jaws.

Figure 2 is a top plan view of a female fifth wheel assembly incorporating my novel means for actuating the locking jaws.

Figure 3 is a top plan view of the female fifth wheel assembly shown in Figure 2, disclosing the manner in which the mechanism operates to open the locking jaws.

Figure 4 is a fragmentary detail of the mechanism for obtaining the closing of the locking jaws through tilting of the fifth wheel assembly.

With reference to the drawing, I have shown in Figure 1 the rear end of a vehicle frame A supported by the usual road wheels B upon which is mounted a conventional type of female fifth wheel devices C of the type intended to cooperate with a male coupling part mounted upon another vehicle. The mounting for this fifth wheel C may be of the usual type such as that disclosed in the Martin and Farr Patent No. 1,412,025 which includes a transverse pin D forming an axis about which the fifth wheel may tilt to the position shown in Figure 1 when the fifth wheel is uncoupled from a king pin.

As usual in this type of female fifth wheel construction, there is found a usual guide slot 1, Figure 2, for the king pin, the walls of the slot being intended to guide the pin into the narrow slot 2 wherein the locking jaws 3 work about vertical pivots 4 to open and closed position.

It is understood that this type of fifth wheel is a type disclosed in the Martin and Farr patent mentioned supra, and the body of the same is preferably a casting wherein the load receiving surface 5 extends beyond, at its marginal edge, a wall 6 that is normal thereto. The casting is suitably formed to accommodate the locking jaws below the load surface 5, as well as the instrumentalities for shifting the locking jaws without presenting herein a detailed description of the casting.

Returning again to the locking jaws 3 which are movable about their pivots 4 into and out of the slot 2, the force necessary to actuate the same is transmitted through a lever arrangement which includes the link members 8 each of which are pivotally connected as at 9 to the locking jaws at one end, and at the other end to a pair of oppositely disposed bell cranks, the pivot being identified at 10. The bell cranks of course are each pivoted upon a suitable pin 11 and one arm thereof is bifurcated as at 12, which cooperates with a pin member 14, of which there are two, one of which cooperates with each bifurcated end, said pin members being formed as a part of a drawbar 15. It will be apparent that movement of the drawbar to the left in Figure 2 will serve to rotate the bell cranks about their axes 11, thus applying a direct force on the links 8 to shift the locking jaws about their pivots and move the abutting parts thereof out of engagement to clear the slot 2 so that the king pin may move therefrom as in uncoupling the tractor and trailer combinations. A resilient member 16 is connected to each of pins 11 and anchored on the fifth wheel, and which tends to urge the drawbar 18 toward the right at all times, which, of course, tends to maintain the locking jaws in closed position.

The means for controlling the actuation of the locking jaws consists in a lever 17 preferably of the configuration shown in Figure 2 that is pivotally connected as at 18 adjacent one end to the extremity of the drawbar 15 which lies beyond the marginal edge of the fifth wheel casting, as shown. This lever 17 is of special design in that the lower end thereof, Figure 2, has a curved zone 19 presenting an arcuate face to the vertical wall 6 of the fifth wheel and it is further formed with a boss 20 that is drilled for the reception of a pin 21 which mounts a small lever 22 to be hereinafter referred to.

Obviously, by pulling on the long arm of the lever 17 toward the left in Figure 2, the arcuate face 19 is cammed against the vertical wall 6 and the drawbar 15 is shifted outwardly to operate the bell cranks and link 8 to shift the locking jaws. The lever 17, when the locking jaws are open, assumes the position shown in Figure 3. This may be done manually or by some instrumentalities such as that shown at 23, from some remote part of the vehicle.

It may be said that the lever 17, when moved to an on-center position with respect to the drawbar 15 as in Figure 3, is locked against movement as long as the fifth wheel remains in horizontal position, albeit the lever may be returned to the position shown in Figure 2, manually. Accordingly, the operator of the machine can throw the handle around to the position shown in Figure 3 which opens the locking jaws and can then drive the tractor out from under the trailer without further help and without need for further manual intervention. It is quite obvious that when the lever is thrown to the position shown in Figure 3, the springs 16 acting through the drawbar and pin 18 urge the lever 17 into engagement with the wall 6 whereby the locking jaws are held in retracted position.

Referring again to the lever 22 as shown in Fig. 4, it will be seen that intermediate its length the same takes a bearing in the zone 24 against the drawbar 15 with the parts in the relation shown in Figure 3. Attached to the lower end of this member 22 is a chain 25 which is connected by the bolt 26 to the vehicle frame.

When tractor-trailer vehicles employing coupling instrumentalities of the fifth wheel class are joined together, the fifth wheel lies in substantially a horizontal plane. However, when the tractor and trailer are separated the fifth wheel tilts as shown in Figure 1. Before separation, however, the locking jaws must be moved out of the slot 2 to release the king pin, and accordingly, the operator moves the lever 17 to the position shown in Figure 3. As the vehicles are separated and the load is removed from the fifth wheel, it tilts backward as in Figure 1 and in so doing the slack is taken up on the chain 25 and the weight of the fifth wheel on the overbalanced side effects the fulcruming of the member 22 on the drawbar 15 as mentioned and by virtue of such bearing the member 22 acting on the short arm shifts the lever 17 about its pivot, thereby allowing the drawbar 15 to be urged inwardly under the influence of the springs 16. When the lever 17 returns to the position shown in Figure 2 the locking jaws are closed.

By virtue of the novel arrangement herein described, the uncoupling of a tractor and trailer may be accomplished single-handedly and the operator may rest assured that after the separation of the vehicles the locking jaws will be returned to closed position in readiness for subsequent coupling operations.

It is obvious that other instrumentalities may be substituted for the chain and lever to effect the actuation of the lever 17. The broad thought behind the invention, however, is to obtain the closing of the locking jaws through the tilting of the fifth wheel and I do not care to be limited to the exact structure shown except as indicated in the appended claims.

Having thus described my invention, what I claim as new and desire to secure by Letters Patent of the United States is—

1. In combination with a fifth wheel having coupling means and a transverse support upon which said fifth wheel is pivotally mounted, means for actuating said coupling mechanism including a coupling lever movable to a position for holding said locking mechanism in one position of adjustment, and means for releasing said lever incident to the movement of the fifth wheel about its pivot to thereby actuate said coupling mechanism, said last named means including a part attached at one end to the vehicle frame, and at the other end to the said lever.

2. In combination with a female fifth wheel assembly having a mounting upon which it is pivotally supported, and a pin receiving slot having locking jaws working therein, means for operating said locking jaws, including a drawbar and a lever movable to a position on line with the drawbar to hold the locking jaws open, said lever abutting against said fifth wheel at one end when in such position, and instrumentalities for moving said lever incident to movement of the fifth wheel on its pivots, whereby the drawbar may be moved to readjust the locking jaws, said instrumentalities including a lever secured to the first named lever and having a fulcrum on the drawbar.

3. In combination with a female fifth wheel having the usual locking jaws, a drawbar for operating said locking jaws, resilient means for urging said drawbar in one direction, means for urging said drawbar in another direction and for locking the same in one position of adjustment, which comprises a lever pivotally connected to the said drawbar, and a second lever mounted on said first lever and having a fulcrum on said drawbar for releasing said first lever and allowing the drawbar to be moved by the said resilient members incident to pivoting movement of said second lever relatively to said first lever.

4. In combination with a vehicle, a female fifth wheel, a pivotal mounting therefor secured to said vehicle, a slot in said fifth wheel having a pair of locking jaws movable into and out of said slot to engage the king pin of a complemental coupling device upon another vehicle, means for actuating said locking jaws to open the same, and means for closing said locking jaws incident to the movement of said female fifth wheel in its pivotal mounting, said last named means including a flexible part connected at one end with the vehicle, and at the other end with the jaw closing means.

5. In combination with a fifth wheel having a female coupling member adapted for cooperative engagement with a male coupling member, and having a movably mounted draw bar coacting with said female coupling member for actuation of the latter, said draw bar extending radially outwardly of said fifth wheel and projecting beyond the outer edge thereof, of a draw bar actuating member comprising a lever pivotally mounted on the outer extremity of the draw bar and including a pair of arms, one lying on each side of the pivotal connection of the lever with the draw bar, one of said arms being engageable with the outer edge of said fifth wheel incident to a swinging movement of the lever imparted by said other arm and serving to cam said pivotal connection outwardly from said fifth wheel, thereby drawing said draw bar radially outwardly and actuating said female coupling member.

6. In combination with a fifth wheel having a female coupling member adapted for cooperative engagement with a male coupling member, and having a movably mounted draw bar coacting with said female coupling member for actuation of the latter, said draw bar extending radially outwardly of said fifth wheel and projecting beyond the outer edge thereof, of a draw bar actuating member comprising a lever pivotally mounted on the outer extremity of the draw bar and including a cam surface engageable with the fifth wheel incident to a swinging motion of the lever in one direction with respect to the draw bar, said cam surface forcing said pivotal connection and said draw bar outwardly with respect to said fifth wheel during such swinging motion of the lever.

7. In combination with a fifth wheel having a female coupling member adapted for cooperative engagement with a male coupling member, and having a movably mounted draw bar coacting with said female coupling member for actuation of the latter, said draw bar extending radially outwardly of said fifth wheel and projecting beyond the outer edge thereof, of a draw bar actuating member comprising a lever pivotally mounted on the outer extremity of the draw bar and including a cam surface engageable with the fifth wheel incident to a swinging motion of the lever in one direction with respect to the draw bar, said cam surface forcing said pivotal connection and said draw bar outwardly with respect to said fifth wheel during such swinging motion of the lever, and said cam surface having one position in the swinging motion of said lever aforesaid wherein said draw bar is automatically locked in an outward position and said lever is automatically maintained with the cam surface in such position.

8. In combination with a fifth wheel having a female coupling member movable to coupling and uncoupling positions, and having a movably mounted draw bar coacting with said coupling member for actuation of the latter, said draw bar extending radially outwardly of said fifth wheel and projecting beyond the outer edge thereof and being provided with means for normally maintaining the same in an inward position in which said coupling member is disposed in coupling position, of a draw bar actuating member comprising a lever pivotally mounted on the outer extremity of the draw bar and including a cam surface engageable with the fifth wheel incident to a swinging motion of the lever in one direction with respect to the draw bar, said cam surface forcing said pivotal connection and said draw bar outwardly with respect to said fifth wheel to actuate said coupling member to uncoupling position during the swinging motion of the lever aforesaid and having one position in the swinging motion of said lever wherein said draw bar is automatically locked in an outward position and said lever is automatically maintained with the cam surface in such position, said cam surface further automatically acting to swing said lever and release said draw bar incident to an initial movement of said lever in an opposite direction beyond such locking position.

9. In combination with a fifth wheel having a female coupling member movable to coupling and uncoupling positions, and having a movably mounted draw bar coacting with said coupling member for actuation of the latter, said draw bar extending radially outwardly of said fifth wheel and projecting beyond the outer edge thereof and being provided with means for normally maintaining the same in an inward position in which said coupling member is disposed in coupling position, of a draw bar actuating member comprising a lever pivotally mounted on the outer extremity of the draw bar and including a cam surface engageable with the fifth wheel incident to a swinging motion of the lever in one direction with respect to the draw bar, said cam surface forcing said pivotal connection and said draw bar outwardly with respect to said fifth wheel to actuate said coupling member to uncoupling position during the swinging motion of the lever aforesaid and having one position in the swinging motion of said lever wheren said draw bar is automatically locked in an outward position and said lever is automatically maintained with the cam surface in such position, said cam surface further automatically acting to swing said lever and release said draw bar incident to an initial movement of said lever in an opposite direction beyond such locking position, and means carried by said lever for imparting such initial release movement to said lever.

10. In a vehicle, the combination with a fifth wheel rockably mounted thereon and having a coupling member movable to coupling and uncoupling positions, and having a draw bar extending radially outwardly of said fifth wheel and projecting beyond the outer edge thereof, said draw bar coacting with said coupling member and being radially movable outwardly for actuation of said coupling member to uncoupling position and radially movable inwardly for actuation of said coupling member to coupling position, and means for yieldably maintaining said draw bar in an inward position with said coupling member in coupling position, of a draw bar actuating member comprising a lever pivotally mounted on the outer extremity of the draw bar and including a cam surface engageable with the fifth wheel incident to a swinging motion of the lever in one direction with respect to the draw bar, said cam surface forcing said pivotal connection and said draw bar outwardly with respect to said fifth wheel during such motion of the lever and having one position in the swinging motion of said lever wherein said draw bar is automatically locked in its outward position and said lever is automatically maintained with the cam surface in such position, said lever being automatically movable in an opposite direction to release said draw bar incident to an initial movement imparted to said lever in said opposite direction, and means for imparting such initial movement to said lever actuated responsively to a rocking motion of said fifth wheel on the vehicle.

11. In a vehicle, the combination with a fifth wheel rockably mounted thereon and having a coupling member movable to coupling and uncoupling positions, and having a draw bar extending radially outwardly of said fifth wheel and projecting beyond the outer edge thereof, said draw bar coacting with said coupling member and being radially movable outwardly for actuation of said coupling member to uncoupling position and radially movable inwardly for actuation of said coupling member to coupling position, and means for yieldably maintaining said draw bar in an inward position with said coupling member in coupling position, of a draw bar actuating member comprising a lever pivotally mounted on the outer extremity of the draw bar and including a cam surface engageable with the fifth wheel incident to a swinging motion of the lever in one direction with respect to the draw bar, said cam surface forcing said pivotal connection and said draw bar outwardly with respect to said fifth wheel during such motion of the lever and having one position in the swinging motion of said lever that said draw bar is automatically locked in its outward position and said lever is automatically maintained with the cam surface in such position, said lever being automatically movable in an opposite direction to release said draw bar incident to an initial movement imparted to said lever in said opposite direction, and means for imparting such initial movement to said lever actuated responsively to a rocking motion of said fifth wheel on the vehicle, said means including a second lever pivotally mounted on said first lever and fulcrumed on said draw bar when said first lever is in a position locking said draw bar outwardly, and a flexible member connected to said second lever and to said vehicle, said flexible member normally being slack but exerting a pull on said second lever responsive to a predetermined rocking motion of said fifth wheel on said vehicle.

12. A draw bar actuating member for fifth wheels of the type embodying a coupling member and a draw bar coacting therewith and extending radially outwardly of said fifth wheel beyond the outer edge thereof and wherein said draw bar is radially movable inwardly and outwardly to actuate said coupling member to coupling and uncoupling positions respectively, said draw bar actuating member comprising a lever having provision for bodily and pivotal mounting of the lever on the outer extremity of the draw bar and provided with an arcuate cam face at one end engageable with a surface of the fifth wheel when so mounted, the length of said lever between the point of pivot on the draw bar and the end of the cam face being greater than the length of the portion of the draw bar extending beyond the fifth wheel when the coupling member of the fifth wheel is in coupling position, whereby a swinging movement of the lever in one direction relatively to the draw bar fulcrums the cam face on the fifth wheel to draw the draw bar outwardly with respect to the fifth wheel.

ELMER F. HATHORN.